US007121137B2

(12) United States Patent
Hosoya

(10) Patent No.: US 7,121,137 B2
(45) Date of Patent: Oct. 17, 2006

(54) DIAGNOSIS APPARATUS FOR AIR TRANSFER APPARATUS AND METHOD THEREOF

(75) Inventor: Hajime Hosoya, Atsugi (JP)

(73) Assignee: Hitachi, Ltd., Tokyo-to (JP)

( * ) Notice: Subject to any disclaimer, the term of this patent is extended or adjusted under 35 U.S.C. 154(b) by 33 days.

(21) Appl. No.: 10/942,815

(22) Filed: Sep. 17, 2004

(65) Prior Publication Data

US 2005/0089407 A1 Apr. 28, 2005

(30) Foreign Application Priority Data

Sep. 22, 2003 (JP) ............................ 2003-329568

(51) Int. Cl.
*G01M 15/00* (2006.01)

(52) U.S. Cl. ..................................................... 73/118.1

(58) Field of Classification Search .................. 73/116, 73/117.2, 117.3, 118.1, 119 R, 40, 46, 47, 73/49.7

See application file for complete search history.

(56) References Cited

U.S. PATENT DOCUMENTS 5,146,902 A * 9/1992 Cook et al. ................. 123/518
5,635,630 A * 6/1997 Dawson et al. .......... 73/40.5 R
6,389,882 B1 * 5/2002 Ohkuma ..................... 73/49.7
6,964,193 B1 * 11/2005 Kobayashi et al. ........ 73/118.1
2004/0173013 A1 * 9/2004 Kobayashi et al. ........ 73/118.1
2004/0200460 A1 * 10/2004 Mitani et al. ............... 123/520
2004/0250604 A1 * 12/2004 Watanabe et al. ............ 73/49.2
2005/0000273 A1 * 1/2005 Hosoya ...................... 73/49.7
2005/0022588 A1 * 2/2005 Hayakawa et al. ........ 73/118.1
2005/0044931 A1 * 3/2005 Ohhashi et al. ................ 73/46
2005/0056089 A1 * 3/2005 Ohhashi et al. ............ 73/118.1

FOREIGN PATENT DOCUMENTS

JP 2003-013810 A 1/2003

* cited by examiner

*Primary Examiner*—Eric S. McCall
(74) *Attorney, Agent, or Firm*—Foley & Lardner LLP

(57) ABSTRACT

An air pump is driven under a condition where a check valve is not opened, and an occurrence of failure in the check valve and the air pump is diagnosed based on a driving load of the air pump or a pressure upstream of the check valve or a pressure downstream of the check valve at the time.

27 Claims, 4 Drawing Sheets

DIAGNOSIS APPARATUS FOR AIR TRANSFER APPARATUS AND METHOD THEREOF

FIELD OF THE INVENTION

The present invention relates to a diagnosis apparatus for an air transfer apparatus for supplying air to a shielded section by an air pump or sucking air from the shielded section by the air pump, and a method thereof.

RELATED ART

Japanese Unexamined Patent Publication No. 2003-013810 discloses a diagnosis apparatus for diagnosing whether or not the leakage occurs in a fuel vapor passage of a fuel vapor purge system.

In this diagnosis apparatus, the fuel vapor passage is shielded by means of a valve, and the shielded section is supplied with air by an air pump, to be pressurized.

Then, based on a driving load of the air pump, it is judged whether or not the leakage occurred in the fuel vapor passage.

However, if there occurs an abnormality in the air pump or a check valve disposed in a passage through which the air is transferred by the air pump, the accuracy in the leakage diagnosis is deteriorated.

Therefore, it is demanded that the failure diagnosis is performed on the air pump and the check valve.

However, it is hard to perform with accuracy the failure diagnosis of the air pump and the check valve during the leakage diagnosis.

SUMMARY OF THE INVENTION

The present invention has an object to enable the failure diagnosis of an air pump and a check valve to be performed with accuracy.

In order to achieve the above object, according to the present invention, an air pump is driven under a condition where a check valve is held in a closed state, and it is diagnosed whether or not a failure occurred in an air transfer apparatus based on a transfer state of air at the time.

The other objects and features of this invention will become understood from the following description with reference to the accompanying drawings.

DESCRIPTION OF EMBODIMENTS

Figure 1:
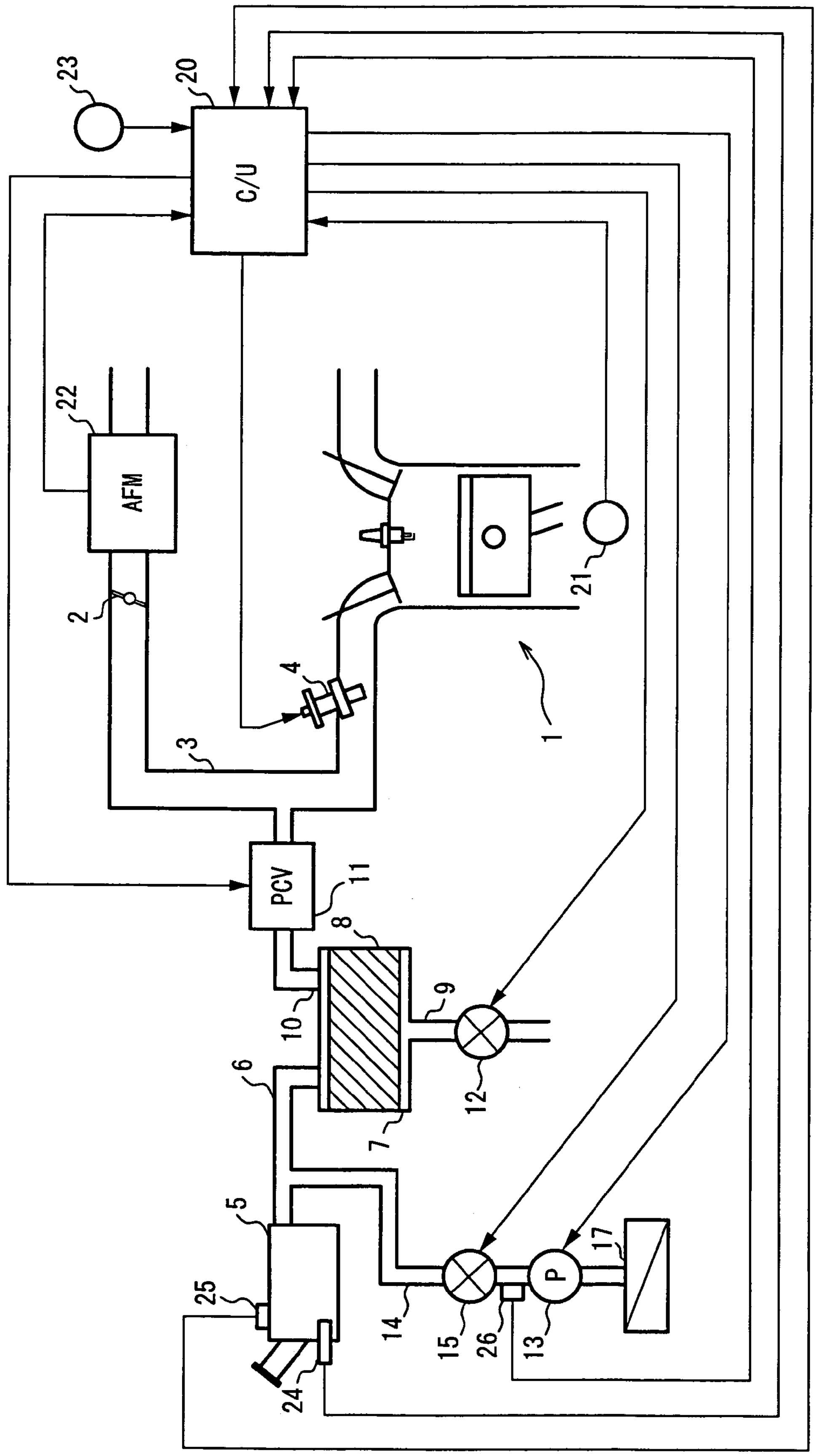
FIG. 1 is a diagram showing a system configuration of an internal combustion engine in an embodiment.

An internal combustion engine 1 shown In FIG. 1 is a gasoline engine installed in a vehicle.

A throttle valve 2 is disposed in an intake pipe 3 of internal combustion engine 1.

An intake air amount of internal combustion engine 1 is controlled by throttle valve 2.

For each cylinder, an electromagnetic type fuel injection valve 4 is disposed in a manifold portion of intake pipe 3 on the downstream side of throttle valve 2.

Fuel injection valve 4 injects fuel based on an injection pulse signal output from a control unit 20 incorporating therein a microcomputer.

Internal combustion engine 1 is provided with a fuel vapor purge system.

The fuel vapor purge system comprises an evaporation passage 6, a canister 7, a purge passage 10 and a purge control valve 11.

Fuel vapor generated in a fuel tank 5 is trapped to canister 7 via evaporation passage 6.

Canister 7 is a container filled with the adsorbent 8 such as activated carbon.

Further, a new air inlet 9 is formed to canister 7, and a purge passage 10 is connected to canister 7.

Purge passage 10 is connected to intake pipe 3 on the downstream side of throttle valve 2 via purge control valve 11.

Purge control valve 11 is opened based on a purge control signal output from control unit 20.

When a predetermined purge permission condition is established during an operation of internal combustion engine 1, purge control valve 11 is controlled to open.

When purge control valve 11 is controlled to open, an intake negative pressure of internal combustion engine 1 acts on canister 7, so that the fuel vapor adsorbed to canister 7 is detached by the fresh air, which is introduced through new air inlet 9.

Purged gas inclusive of the fuel vapor detached from canister 7 passes through purge passage 10 to be sucked into intake pipe 3.

Control unit 20 incorporates therein a microcomputer comprising a CPU, a ROM, a RAM, an A/D converter and an input/output interface.

Control unit 20 receives detection signals from various sensors.

As the various sensors, there are provided a crank angle sensor 21 detecting a rotation angle of a crankshaft, an air flow meter 22 measuring an intake air amount of internal combustion engine 1, a vehicle speed sensor 23 detecting a vehicle speed, a pressure sensor 24 detecting a pressure in fuel tank 5, and a fuel level sensor 25 detecting a fuel level in fuel tank 5.

Further, a drain cut valve 12 for opening/closing new air inlet 9 and an air pump 13 for supplying air to evaporation passage 6 are disposed, for diagnosing whether or not the leakage occurred in a fuel vapor passage of the fuel vapor purge system.

A discharge port of air pump 13 is connected to evaporation passage 6 via an air supply pipe 14.

An electromagnetic check valve 15 is disposed in the halfway of air supply pipe 14.

Electromagnetic check valve 15 is a check valve preventing the backflow in a passage through which the air is supplied into a shielded section by air pump 13.

Electromagnetic check valve 15 is provided with an electromagnetic solenoid as an actuator generating the valve opening energy.

Then, by performing the ON/OFF control of the electromagnetic solenoid, electromagnetic check valve 15 can be opened/closed, irrespective of a primary side pressure of electromagnetic check valve 15.

Further, an air cleaner 17 is disposed on the inlet port side of air pump 13.

When a diagnosis condition is established, control unit 20 controls purge control valve 11 and drain cut valve 12 to close.

As a result, fuel tank 5, evaporation passage 6, canister 7 and purge passage 10 on the downstream of purge control valve 11, are shielded as a diagnosis section.

Here, if air pump 13 is activated, the diagnosis section is pressurized.

Then, it is diagnosed an occurrence of leakage in the diagnosis section, based on a pressure change in fuel tank 5 at the time when the diagnosis section is pressurized by air pump 13.

Note, it is possible to diagnose the occurrence of leakage, based on the pressure drop after the diagnosis section is pressurized up to a predetermined pressure.

Further, it is possible to diagnose the occurrence of leakage, based on a driving load of air pump 13 at the time when the diagnosis section is pressurized.

Moreover, it is possible that the pressure in the diagnosis section is reduced by sucking the air from the diagnosis section by air pump 13, to diagnose the occurrence of leakage, based on the pressure in fuel tank 5 or the driving load of air pump 13 at the time.

Figure 2:
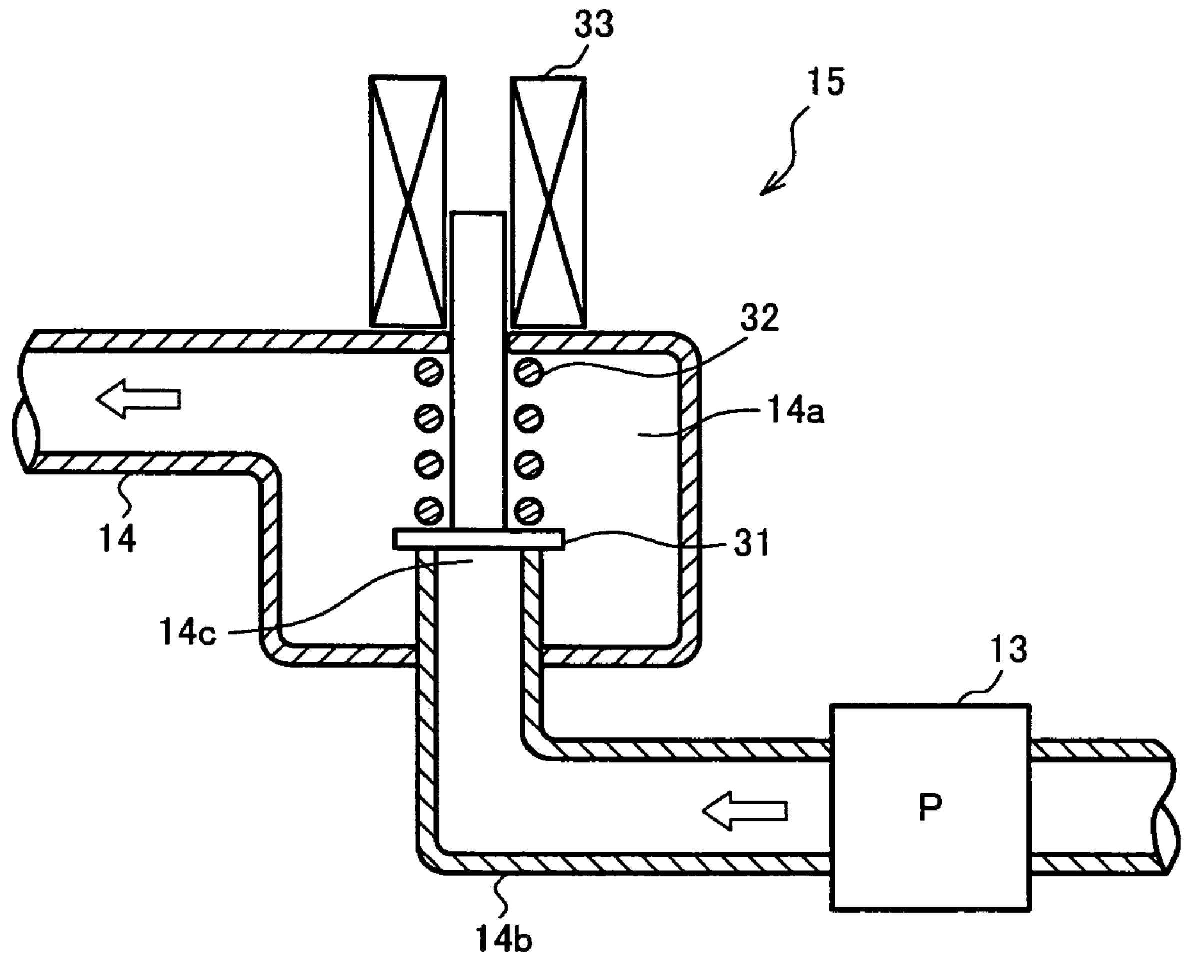
FIG. 2 is a cross section of an electromagnetic check valve shown in FIG. 1.

Electromagnetic check valve 15 is configured as shown in FIG. 2.

A volumetric chamber 14*a,* which is opened toward the downstream side, is formed in the halfway of air supply pipe 14.

Volumetric chamber 14*a* is connected to the discharge port of air pump 13 via air piping 14*b.*

An open end 14*c* of air piping 14*b* passes through a wall of volumetric chamber 14*a,* to be extended into volumetric chamber 14*a.*

A plate shaped valve 31 shielding open end 14*c* is urged by a coil spring 32 to a direction shielding open end 14*c.*

A fluid pressure in a backflow direction toward air pump 13 from evaporation passage 6, acts as a pressure to close valve 31, thereby preventing the backflow.

Further, electromagnetic check valve 15 is provided with an electromagnetic solenoid 33, which is supplied with the electric power to apply an electromagnetic force for valve opening on valve 31.

Here, a setting load of spring force of coil spring 32 is set to be a maximum generated pressure or above of air pump 13.

Accordingly, even if air pump 13 is driven at a maximum, in a state where electromagnetic solenoid 33 is OFF, electromagnetic check valve 15 is held in a closed state.

Therefore, when the diagnosis section is supplied with the air to be pressurized by air pump 13, electromagnetic solenoid 33 is turned ON, to generate the valve opening energy against an urging force for valve closing by coil spring 32.

As a result, it is possible to arbitrarily open/close electromagnetic check valve 15, by controlling the supply of electric current to electromagnetic solenoid 33.

Further, in the case where electromagnetic check valve 15 is disposed between evaporation passage 6 and air pump 13, the fuel vapor within evaporation passage 6 is prevented from reaching air pump 13.

Moreover, if the fuel vapor can be prevented from invading into air pump 13, by electromagnetic check valve 15, it becomes unnecessary to apply a complicated and expensive sealing structure.

Further, even if there occurs an abnormality in which air pump 13 continues to rotate, when the power supply to electromagnetic solenoid 33 is shut off, electromagnetic check valve 15 can be closed, so that the abnormal pressurization or depressurization of the diagnosis section can be avoided.

Figure 3:
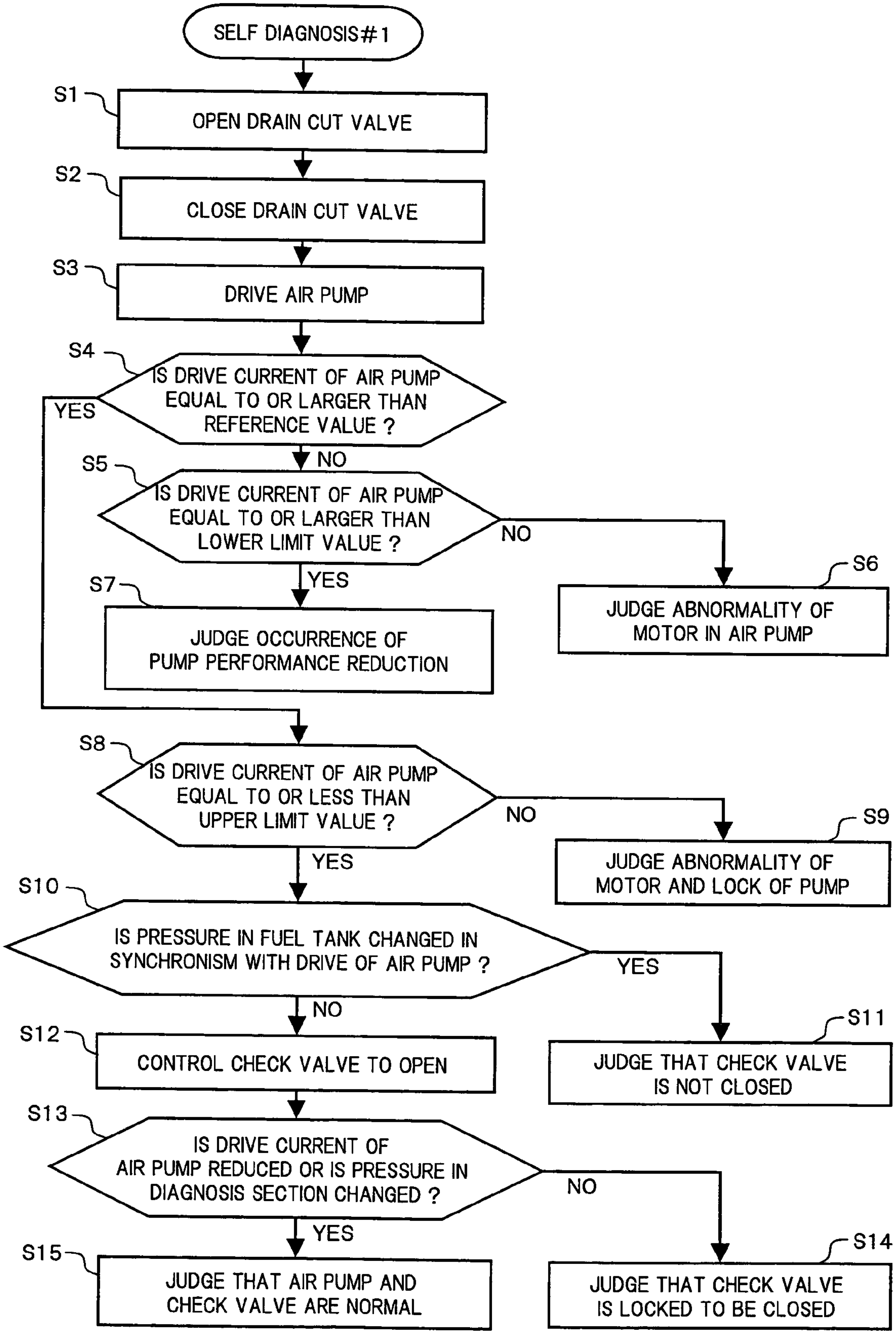
FIG. 3 is a flowchart showing the failure diagnosis of an air pump and the check valve.

Control unit 20 performs the leakage diagnosis, and also the failure diagnosis of electromagnetic check valve 15 and air pump 13 as shown in a flowchart of FIG. 3.

In step S1, drain cut valve 12 is opened, to bring an objective section of the leakage diagnosis into the atmospheric pressure.

In step S2, drain cut valve 12 is closed, to shield the objective section of the leakage diagnosis.

Note, the diagnosis is executed when the purging is not performed, such as, just after an engine operation is stopped. Therefore, purge control valve 11 is held in a closed state, and the objective section of the leakage diagnosis is shielded by only closing drain cut valve 12.

In step S3, air pump 13 is driven, to supply the air toward the diagnosis section.

Here, since an opening control of electromagnetic check valve 15 is not performed, electromagnetic check valve 15 is held in the closed state.

In step S4, a drive current of air pump 13 indicating the driving load of air pump 13 is detected by a current detector, and it is judged whether or not the drive current reaches a reference value or above.

The reference value is set to a value, which is exceeded by a detected value, in the case where air pump 13 and electromagnetic check valve 15 are in normal states.

If the drive current does not reach the reference value or above, control proceeds to step S5, where it is judged whether or not the drive current is equal to or larger than a lower limit value.

Note, the reference value>the lower limit value.

If the drive current is less than the lower limit value, control proceeds to step S6, where it is judged that there occurs an abnormality in air pump 13 (abnormality of motor).

On the other hand, if the drive current is equal to or larger than the lower limit value, control proceeds to step S7.

In step S7, it is judged that there occurs any of the performance reduction of air pump 13, the leakage out of electromagnetic check valve 15, and the leakage out of the piping between electromagnetic check valve 15 and air pump 13.

Further, if it is judged in step S4 that the drive current reaches the reference value or above, control proceeds to step S8.

In step S8, it is judged whether or not the drive current is equal to or less than an upper limit value.

Note, the upper limit value>the reference value>the lower limit value.

If the drive current exceeds the upper limit value, control proceeds to step S9, where it is judged that there occurs an abnormality in air pump 13 (abnormality of motor and/or locking of pump).

On the other hand, if the drive current is equal to or less than the upper limit value, it is judged that air pump 13 is in the normal state and control proceeds to step S10.

In step S10, it is judged whether or not the pressure in fuel tank 5 is increased in synchronism with the drive of air pump 13.

Herein, air pump 13 is driven while electromagnetic check valve 15 being held in the closed state. Therefore, the pressure in fuel tank 5 is never influenced by the drive of air pump 13 if electromagnetic check valve 15 is actually held in the closed state.

Accordingly, if it is judged that the pressure in fuel tank 5 is increased in synchronism with the drive of air pump 13, it is estimated that electromagnetic check valve 15 is actually held in an opened state.

In such a case, control proceeds to step S11, where it is judged that there occurs a failure in which electromagnetic check valve 15 is not closed.

Note, in the case where the diagnosis of air pump 13 and check valve 15 is performed immediately after the engine operation is stopped, the pressure in the diagnosis section is gradually increased due to the generation of fuel vapor. Therefore, whether or not the pressure in fuel tank 5 is increased in synchronism with the drive of air pump 13 is judged based on whether or not there occurs the pressure rise exceeding the pressure rise due to the fuel vapor.

On the other hand, when it is judged in step S10 that the pressure in fuel tank 5 is not increased in synchronism with the drive of air pump 13, control proceeds to step S12.

In step S12, electromagnetic solenoid 33 is supplied with the power, to open electromagnetic check valve 15, which has been held in the closed state up to the time.

In next step S13, it is judged whether the drive current (pump load) of air pump 13 is reduced or the pressure in fuel tank 5 is increasingly changed, in synchronism with the opening control of electromagnetic check valve 15.

If electromagnetic check valve 15 which has been held in the closed state, is controlled to open, as a result that the pressure which has been trapped between electromagnetic check valve 15 and air pump 13 up to the time, is released, the driving load of air pump 13 is reduced, and also as a result that the air supply into the diagnosis section is started, the pressure in fuel tank 5 starts to be increasingly changed.

Accordingly, in the case where, although electromagnetic check valve 15 is controlled to open, the drive current of air pump 13 is not reduced and also the pressure in fuel tank 5 is not increasingly changed, control proceeds to step S14, where it is judged that electromagnetic check valve 15 is locked in the closed state.

On the other hand, in the case where the drive current of air pump 13 is reduced and/or the pressure in fuel tank 5 is increasingly changed, in synchronism with the opening control of electromagnetic check valve 15, control proceeds to step S15, where it is judged that air pump 13 and electromagnetic check valve 15 are in the normal states.

Note, it is possible to judge that electromagnetic check valve 15 is locked in the closed state only by the drive current of air pump 13, and also it is possible to judge that electromagnetic check valve 15 is locked in the closed state only by the pressure in fuel tank 5.

Further, in the above embodiment, air pump 13 has been driven in a forward direction, so as to transfer the air in an airflow direction of electromagnetic check valve 15. However, it is possible to rotate air pump 13 to be driven in a reverse direction, to perform the diagnosis.

In the case where air pump 13 is rotated to be driven in the reverse direction, the diagnosis in steps S4 to S9 can be performed in the same manner as in the case where air pump 13 is rotated to be driven in the forward direction.

Moreover, in the case where air pump 13 is rotated to be driven in the reverse direction, in step S10, it is judged whether or not the pressure in fuel tank 5 is reduced in synchronism with the drive of air pump 13, and in step S12, it is judged whether or not the pressure in fuel tank 5 is decreasingly changed.

Further, the diagnosis process shown in the flowchart of FIG. 3 can be applied to the case of performing the leakage diagnosis by depressurizing the diagnosis section by air pump 13, where air pump 13 is driven in the reverse direction (direction for supplying the air into the diagnosis section), to perform the diagnosis of air pump 13 and electromagnetic check valve 15.

Moreover, it is possible to use, as the check valve, a mechanical check valve, which is opened with a primary side pressure.

In the case where the mechanical check valve is used, when air pump 13 is driven in the forward direction, if a discharge amount of air pump 13 is limited so that the primary side of check valve has a pressure less than a valve opening pressure, the diagnosis process of up to step S11 in the flowchart of FIG. 3 can be applied just as it is.

Further, it is possible that electromagnetic check valve 15 is closed out of a state where air pump 13 is driven in the state where electromagnetic check valve 15 is opened, to perform the diagnosis of electromagnetic check valve 15 based on the changes in the driving load of air pump 13 and the pressure in fuel tank 5 with the closing control of electromagnetic check valve 15.

Figure 4:
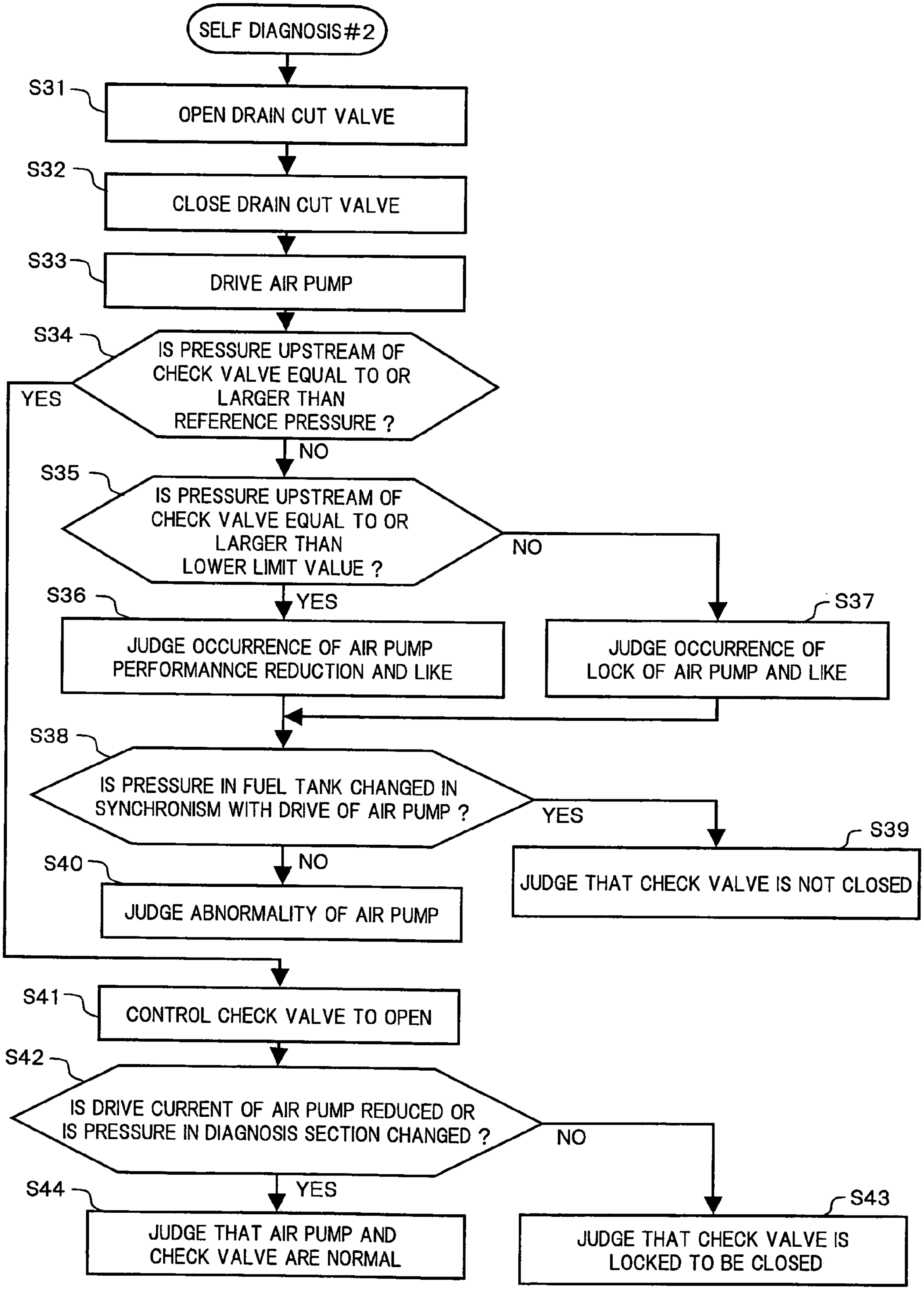
FIG. 4 is a flowchart showing the failure diagnosis of the air pump and the check valve.

Moreover, it is possible that as shown in FIG. 1, a pressure sensor 26 detecting a pressure in the piping between electromagnetic check valve 15 and air pump 13 is disposed, and as shown in a flowchart of FIG. 4, the diagnosis of electromagnetic check valve 15 and air pump 13 is performed.

In step S31, drain cut valve 12 is opened, to bring the objective section of the leakage diagnosis into the atmospheric pressure.

In step S32, drain cut valve 12 is closed, to shield the objective section of the leakage diagnosis.

Note, the leakage diagnosis is executed when the purging is not performed, such as, just after the engine operation is stopped. Therefore, purge control valve 11 is held in the closed state, and the objective section of the leakage diagnosis is shielded by only closing drain cut valve 12.

In step S33, air pump 13 is driven, to supply the air toward the diagnosis section.

Here, since the opening control of electromagnetic check valve 15 is not performed, electromagnetic check valve 15 is held in the closed state.

In step S34, it is judged whether or not the pressure between electromagnetic check valve 15 and air pump 13, which is detected by pressure sensor 26, reaches a reference pressure or above.

If the pressure between electromagnetic check valve 15 and air pump 13 does not reach the reference pressure or above, control proceeds to step S35.

The reference pressure is set to a value, which is exceeded by a detected value of pressure sensor 26, in the case where electromagnetic check valve 15 and air pump 13 are in the normal states.

In step S35, it is judged whether or not the pressure is equal to or larger than a lower limit value.

Note, the reference pressure>the lower limit value.

Then, ff the pressure is equal to or larger than the lower limit value, control proceeds to step S36.

In step S36, it is judged that there occurs any of the motor performance reduction or the pump performance reduction in air pump 13, the leakage out of electromagnetic check valve 15, and the leakage out of the piping between electromagnetic check valve 15 and air pump 13.

On the other hand, if the pressure is less than the lower limit value, control proceeds to step S37.

In step S37, it is judged that there occurs any of the non-rotation state of motor and/or pump in air pump 13, the large leakage out of the piping between electromagnetic check valve 15 and air pump 13 and the state where electromagnetic check valve 15 is not closed.

In step S38, it is judged whether or not the pressure in fuel tank 5 is increased in synchronism with the drive of air pump 13.

Here, if it is judged that the pressure in fuel tank 5 is increased in synchronism with the drive of air pump 13, the air discharged from air pump 13 is supplied into the diagnosis section via electromagnetic check valve 15 which should be closed properly. Accordingly, in such a case, control proceeds to step S39, where it is judged that electromagnetic check valve 15 is not closed or there occurs the leakage out of electromagnetic check valve 15.

On the other hand, if the pressure in fuel tank 5 is not increased in synchronism with the drive of air pump 13, the air is not supplied into the diagnosis section via electromagnetic check valve 15. Therefore, control proceeds to step S40, where it is judged that there occurs an abnormality in the motor and/or the pump in air pump 13.

On the contrary, if it is judged in step S34 that the pressure between electromagnetic check valve 15 and air pump 13, which is detected by pressure sensor 26, reaches the reference pressure or above, control proceeds to step S41.

In step S41, electromagnetic solenoid 33 is supplied with the power, to open electromagnetic check valve 15, which has been held in the closed state up to the time.

Then, in next step S42, it is judged whether the drive current (pump load) of air pump 13 is reduced or the pressure in fuel tank 5 is increasingly changed, in synchronism with the opening control of electromagnetic check valve 15.

If electromagnetic check valve 15 which has been held in the closed state, is controlled to open, as a result that the pressure which has been trapped between electromagnetic check valve 15 and air pump 13 up to the time, is released, the driving load of air pump 13 is reduced, and also as a result that the air supply into the diagnosis section is started, the pressure in fuel tank 5 starts to be increasingly changed.

Accordingly, in the case where, although electromagnetic check valve 15 is controlled to open, the drive current (pump load) of air pump 13 is not reduced and also the pressure in fuel tank 5 is not increasingly changed, control proceeds to step S43, where it is judged that electromagnetic check valve 15 is locked to be closed.

On the other hand, in the case where the drive current (pump load) of air pump 13 is reduced and/or the pressure in fuel tank 5 is increasingly changed, in synchronism with the opening control of electromagnetic check valve 15, control proceeds to S44, where it is judged that air pump 13 and electromagnetic check valve 15 are in the normal states.

Note, in the flowchart of FIG. 4, air pump 13 has been driven in a forward direction of electromagnetic check valve 15 (direction for supplying the air to the diagnosis section). However, it is possible to drive air pump 13 in a reverse direction, to perform the diagnosis.

In the case where air pump 13 is driven in the reverse direction, the pressure drop is judged in step S34, the decreasing change of the pressure in the diagnosis section is judged in steps S38 and S42, and it is judged in step S35 whether the pressure is not at all reduced or is slightly and decreasingly changed.

Further, the diagnosis process shown in the flowchart of FIG. 4 can be applied to the case of performing the diagnosis by depressurizing the diagnosis section by air pump 13, where air pump 13 is driven in the reverse direction (direction for pressurizing the diagnosis section), to perform the diagnosis.

Further, in the case of using the mechanical check valve which is opened by the primary side pressure, when air pump 13 is driven in the forward direction, if the discharge amount of air pump 13 is limited so that the primary side of check valve has the pressure less than the valve opening pressure, the diagnosis process of up to step S40 in the flowchart of FIG. 4 can be applied just as it is.

The entire contents of Japanese Patent Application No. 2003-329568 filed on Sep. 22, 2003, a priority of which is claimed, are incorporated herein by reference.

While only a selected embodiment has been chosen to illustrate the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and not for the purpose of limiting the invention as defined in the appended claims and their equivalents.

What is claimed is:

1. A diagnosis apparatus for an air transfer apparatus which includes an air pump transferring air to a shielded section and a check valve disposed in a transfer passage between said shielded section and said air pump, comprising:

a drive unit for driving said air pump to transfer air at a pressure less than a valve opening pressure of a check valve;

a transfer state detector that detects a state quantity which changes depending on transferring of air by said air pump; and a diagnosis unit that diagnoses whether or not a failure occurred in said air transfer apparatus based on the state quantity detected by said transfer state detector, when said air pump is driven by said drive unit.

2. A diagnosis apparatus for an air transfer apparatus according to claim 1, wherein said transfer state detector detects a driving load of said air pump.

3. A diagnosis apparatus for an air transfer apparatus according to claim 2, wherein said diagnosis unit judges an occurrence of failure in said air pump, when the driving load of said air pump is less than a lower limit value and when the driving load of said air pump exceeds an upper limit value.

4. A diagnosis apparatus for an air transfer apparatus according to claim 1, wherein said transfer state detector detects a pressure in the transfer passage between said air pump and said check valve.

5. A diagnosis apparatus for an air transfer apparatus according to claim 4, wherein said diagnosis unit judges the occurrence of failure in said air transfer apparatus, in the case where the pressure in the transfer passage between said air pump and said check valve is not changed up to a predetermined pressure.

6. A diagnosis apparatus for an air transfer apparatus according to claim 1, wherein said transfer state detector detects a pressure in said shielded section.

7. A diagnosis apparatus for an air transfer apparatus according to claim 6, wherein said diagnosis unit judges an occurrence of failure in said check valve, in the case where the pressure in said shielded section is changed in synchronism with the drive of said air pump.

8. A diagnosis apparatus for an air transfer apparatus which includes an air pump transferring air to a shielded section and a check valve disposed in a transfer passage between said shielded section and said air pump, comprising:

a drive unit that drives said air pump under a condition where said check valve is held in a closed state;

a transfer state detector detecting a transfer state of the air by said air pump; and a diagnosis unit that diagnoses whether or not a failure occurred in said air transfer apparatus based on the transfer state of the air detected by said transfer state detector, when said air pump is driven by said drive unit, wherein said transfer state detector detects a pressure in the transfer passage between said air pump and said check valve, and also detects a pressure in said shielded section, and wherein said diagnosis unit:

judges whether or not the pressure in said shielded section is changed in synchronism with the drive of said air pump, when the pressure in the transfer passage between said air pump and said check valve is not changed up to a predetermined pressure;

judges an occurrence of failure in said check valve, when the pressure in said shielded section is changed in synchronism with the drive of said air pump; and judges an occurrence of failure in said air pump, when the pressure in said shielded section is not changed in synchronism with the drive of said air pump.

9. A diagnosis apparatus for an air transfer apparatus according to claim 1, wherein said drive unit drives said air pump, so that the air is transferred in a reverse direction to an airflow direction in said check valve.

10. A diagnosis apparatus for an air transfer apparatus according to claim 1, wherein said drive unit drives said air pump, so that the air is transferred in a direction same as an airflow direction in said check valve, and also a primary side pressure of said check valve does not reach a valve opening pressure.

11. A diagnosis apparatus for an air transfer apparatus which includes an air pump transferring air to a shielded section and a check valve disposed in a transfer passage between said shielded section and said air pump, comprising:

a drive unit that drives said air pump under a condition where said check valve is held in a closed state;

a transfer state detector detecting a transfer state of the air by said air pump; and a diagnosis unit that diagnoses whether or not a failure occurred in said air transfer apparatus based on the transfer state of the air detected by said transfer state detector, when said air pump is driven by said drive unit, wherein said check valve includes:

a resilient body applying on a valve body an urging force for valve closing which is equal to or larger than a maximum generated pressure by said air pump; and an actuator generating a valve opening force against the urging force for valve closing by said resilient body.

12. A diagnosis apparatus for an air transfer apparatus according to claim 11, wherein said drive unit stops the generation of the valve opening force by said actuator, to establish a condition where said check valve is held in the closed state.

13. A diagnosis apparatus for an air transfer apparatus according to claim 12, wherein said drive unit switches the generation/stop of valve opening force by said actuator, and wherein said diagnosis unit diagnoses the occurrence of failure in said air transfer apparatus based on a change in said transfer state with the switching of the generation/stop of valve opening force by said actuator.

14. A diagnosis apparatus for an air transfer apparatus which includes an air pump for transferring air to a shielded section and a check valve disposed in a transfer passage between said shielded section and said air pump, comprising:

drive means for driving said air pump to transfer an air with a pressure of less than valve opening pressure of a check valve;

transfer state detecting means for detecting a state quantity which changes based on a transfer of air by said air pump; and diagnosis means for diagnosing whether or not a failure occurred in said air transfer apparatus based on the state quantity detected by said detecting means, when said air pump is driven by said drive means.

15. A diagnosis method for an air transfer apparatus which includes an air pump transferring air to a shielded section and a check valve disposed in a transfer passage between said shielded section and said air pump, comprising the steps of:

driving said air pump in order to transfer an air with a pressure of less than valve opening pressure of a check valve;

detecting a state quantity which changes based on a transfer of air by said air pump; and diagnosing whether or not a failure occurred in said air transfer apparatus based on said state quantity.

16. A diagnosis method for an air transfer apparatus according to claim 15, wherein said step of detecting said state quantity detects a driving load of said air pump.

17. A diagnosis method for an air transfer apparatus according to claim 16, wherein said step of diagnosing the occurrence of failure comprises the steps of:

judging an occurrence of failure in said air pump, when the driving load of said air pump is less than a lower limit value; and judging the occurrence of failure in said air pump, when the driving load of said air pump exceeds an upper limit value.

18. A diagnosis method for an air transfer apparatus according to claim 15, wherein said step of detecting the transfer state comprises the step of:

detecting a pressure in the transfer passage between said air pump and said check valve.

19. A diagnosis method for an air transfer apparatus according to claim 18, wherein said step of diagnosing the occurrence of failure comprises the step of:

judging the occurrence of failure in said air transfer apparatus, in the case where the pressure in the transfer passage between said air pump and said check valve is not changed up to a predetermined pressure.

20. A diagnosis method for an air transfer apparatus according to claim 15, wherein said step of detecting the transfer state comprises the step of:

detecting a pressure in said shielded section.

21. A diagnosis method for an air transfer apparatus according to claim 20, wherein said step of diagnosing the occurrence of failure comprises the step of:

judging an occurrence of failure in said check valve, in the case where the pressure in said shielded section is changed in synchronism with the drive of said air pump.

22. A diagnosis method for an air transfer apparatus which includes an air pump transferring air to a shielded section and a check valve disposed in a transfer passage between said shielded section and said air pump, comprising the steps of:

driving said air pump under a condition where said check valve is held in a closed state;

detecting a transfer state of the air by said air pump; and diagnosing whether or not a failure occurred in said air transfer apparatus based on the transfer state of the air, wherein said step of detecting the transfer state comprises the steps of:

detecting a pressure in the transfer passage between said air pump and said check valve; and detecting a pressure in said shielded section, and wherein said step of diagnosing the occurrence of failure comprises the steps of:

judging whether or not the pressure in said shielded section is changed in synchronism with the drive of said air pump, when the pressure in the transfer passage between said air pump and said check valve is not changed up to a predetermined pressure;

judging an occurrence of failure in said check valve, when the pressure in said shielded section is changed in synchronism with the drive of said air pump; and judging an occurrence of failure in said air pump, when the pressure in said shielded section is not changed in synchronism with the drive of said air pump.

23. A diagnosis method for an air transfer apparatus according to claim 15, wherein said step of driving the air pump comprises the step of:

driving said air pump, so that the air is transferred in a reverse direction to an airflow direction in said check valve.

24. A diagnosis method for an air transfer apparatus according to claim 15, wherein said step of driving the air pump comprises the step of:

driving said air pump, so that the air is transferred in a direction same as an airflow direction in said check valve, and also a primary side pressure of said check valve does not reach a valve opening pressure.

25. A diagnosis method for an air transfer apparatus which includes an air pump transferring air to a shielded section and a check valve disposed in a transfer passage between said shielded section and said air pump, comprising the steps of:

driving said air pump under a condition where said check valve is held in a closed state;

detecting a transfer state of the air by said air pump; and diagnosing whether or not a failure occurred in said air transfer apparatus based on the transfer state of the air, wherein said check valve includes:

a resilient body applying on a valve body an urging force for valve closing which is equal to or larger than a maximum generated pressure by said air pump; and an actuator generating a valve opening force against the urging force for valve closing by said resilient body.

26. A diagnosis method for an air transfer apparatus according to claim 25, wherein said step of driving the air pump comprises the step of;

stopping the generation of the valve opening force by said actuator, to establish a condition where said check valve is held in the closed state.

27. A diagnosis method for an air transfer apparatus according to claim 26, wherein said step of driving the air pump comprises the step of:

switching the generation/stop of valve opening force by said actuator, and wherein said step of diagnosing the occurrence of failure comprises the step of:

diagnosing the occurrence of failure in said air transfer apparatus based on a change in said transfer state with the switching of the generation/stop of valve opening force by said actuator.

* * * * *